Figure 1A:
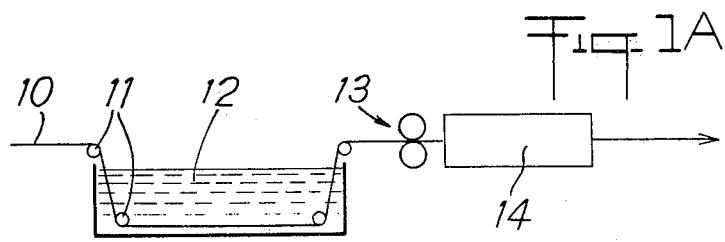

United States Patent [19]

Vallet

[11] 4,325,930

[45] Apr. 20, 1982

[54] PRODUCING A SILICON CARBIDE STRUCTURE AND MULTIDIRECTIONAL SILICON CARBIDE TEXTURE

[75] Inventor: André M. Vallet, Saint-Aubin, France

[73] Assignee: Societe Europeenne de Propulsion, Putraux, France

[21] Appl. No.: 221,448

[22] Filed: Dec. 30, 1980

[51] Int. Cl.³ .................. C01B 31/36; C04B 35/56
[52] U.S. Cl. .......................... 423/345; 501/88
[58] Field of Search .............. 106/44; 423/345; 428/367, 368, 408; 427/180, 199, 227, 228, 261; 264/63, 65; 501/88

[56] References Cited

U.S. PATENT DOCUMENTS

| | | | |
|---|---|---|---|
| 3,462,340 | 8/1969 | Hough | 501/88 |
| 3,927,181 | 12/1975 | Niimi et al. | 423/345 |
| 4,120,731 | 10/1978 | Hillig et al. | 106/44 |
| 4,141,948 | 2/1979 | Laskow et al. | 106/44 |
| 4,150,998 | 4/1979 | Mrelock | 423/345 |
| 4,162,301 | 7/1979 | Hamling | 106/44 |
| 4,238,434 | 12/1980 | Enomoto et al. | 106/44 |

FOREIGN PATENT DOCUMENTS

| | | | |
|---|---|---|---|
| 2500082 | 7/1975 | Fed. Rep. of Germany | 423/345 |
| 2189207 | 3/1973 | France | 423/345 |
| 2227244 | 4/1974 | France | 423/345 |
| 2276916 | 7/1974 | France | 423/345 |
| 866818 | 5/1961 | United Kingdom | 423/345 |
| 998089 | 7/1965 | United Kingdom | 423/345 |
| 1457757 | 12/1976 | United Kingdom | 423/345 |

*Primary Examiner*—O. R. Vertiz
*Assistant Examiner*—Mark Bell
*Attorney, Agent, or Firm*—Fitzpatrick, Cella, Harper & Scinto

[57] ABSTRACT

The method for producing a silicon carbide structure comprises the stages of immersing the carbon structure into a bath containing 20 to 40% by weight of silicon powder in suspension in a liquid medium containing 10 to 30% by weight of fugitive resin, the remainder being constituted by a resin solvent, and of drying the structure in order to obtain an easy-to-handle carbon structure coated with resin and silicon powder bonded in the resin. The structure is then subjected to a heat treatment to let the silicon react with the carbon and produce a silicon carbide structure.

5 Claims, 3 Drawing Figures

PRODUCING A SILICON CARBIDE STRUCTURE AND MULTIDIRECTIONAL SILICON CARBIDE TEXTURE

The present invention particularly relates to a method for producing a silicon carbide structure from a carbon structure.

By "structure" is meant here both a unidirectional element, i.e. a filiform element such as fibers, filaments, rods, etc., and a multidirectional texture, i.e. an assembly of filiform elements cross-ply oriented within a plane: fabrics, felts, etc., or in space: tridimensional texture.

Several methods are already known for producing silicon carbide structures.

One known method consists in spinning organo-silicon compounds of high molecular weight and then in baking the spun fibers to obtain continuous fibers of silicon carbon.

Another known method for producing silicon carbon fibers consists in conducting a chemical vapor deposition of silicon carbide on a carbon or tungstene support.

The disadvantage with these known methods resides in the fact that their application is limited to the production of rigid unidirectional elements of very small diameter. The brittleness of these elements prevents them from being used to produce bi- or tri-dimensional textures in silicon carbide.

It has also been proposed to produce a silicon carbide-containing material by soaking a carbon texture or a carbon-carbon composite material in a molten silicon bath. The carbon texture is impregnated with the liquid silicon by the phenomenon of capillarity and the silicon carbide is produced by reaction of the liquid silicon with the carbon. With this known method, it was found that the composite material obtained is of the Si–SiC type in which the free silicon is inevitably present and acts as a matrix. The presence of free silicon whose melting point is at 1410° C. limits considerably the possibilities of use of the resulting material because its mechanical characteristics are very strongly affected as from 1400° C.

It has also been proposed in British Pat. No. 998,089 to soak a carbon cloth into silicon powder and to subject the powder-coated cloth to a heat treatment in order to obtain a silicon carbide material. With this method, it is difficult to control the quantity of silicon which is deposited on the cloth and virtually impossible to achieve a uniform coating. In addition, the silicon powder-coated material cannot be handled without the silicon powder dropping off. It is also indicated in British Pat. No. 998,089 that the silicon exceeds the stoichiometrical proportion necessary; as a result, there is free silicon in the silicon carbide material.

According to yet another method described in U.S. Pat. No. 3,927,181, carbon micro-balls are immersed in a bath containing a suspension of silicon powder. Then the micro-balls are drained and dried; more than one immersion-draining-drying sequence can be conducted. The dried micro-balls, coated with silicon powder, receive a heat treatment in order to obtain micro-balls in silicon carbide. Said known method does not, any more than the preceding ones, seem to lead to a coating of a given quantity of silicon powder, or to lead to silicon powder-coated products which can be handled without any risk to the silicon coating.

It is the object of the present invention to propose a method for producing a silicon carbide structure, from a carbon structure, which has the following advantages:

possibility to use the method on unidirectional as well as on multidirectional structures;

possibility to control easily the quantity of silicon which covers the carbon structure, and to guarantee the absence of free silicon in the silicon carbide structure;

uniform coating of the carbon structure with the silicon;

the silicon-coated carbon structures obtained are easy to handle and to store.

This object is reached with a method comprising the stages of immersing the carbon structure into a bath containing silicon powder in suspension in a liquid medium, and of drying in order to obtain a carbon structure coated with silicon, these being followed by a heat treatment to let the silicon react with the carbon and to obtain the silicon carbide structure, method—whereby according to the invention: the carbon structure is impregnated by immersion into a bath containing 10 to 30% by weight of fugitive resin, 20 to 40% by weight of silicon powder, the remainder being constituted by a resin solvent; and the drying stage is conducted so as to obtain an easy-to-handle structure coated with resin and silicon powder bonded in the resin.

The composition of the impregnation bath makes it possible to bring the silicon powder evenly over the whole surface of the carbon structure. Moreover, by varying that composition and/or adjusting the dwell period of the structure in the bath, it is possible to control the quantity of silicon deposited and, as a result the conversion rate of carbon into silicon carbide. And especially the presence of free silicon in the structure obtained after the heat treatment can be avoided.

Also, after drying, the silicon is "fixed" to the structure by the resin. The structure can then be handled, without the risk of losing any of the silicon, and even stored for long periods. In particular, the structure can be subjected to shaping operations, depending on the article to be produced, before the heat treatment which will transform the carbon into silicon carbide.

According to another of its aspects, the invention relates to a silicon carbide multidirectional texture, which is characterized in that it is mainly composed of silicon carbide, the remaining part being essentially carbon, excluding free silicon.

Such a texture can be a fabric or a tridimensional texture composed of bundles of cross-ply filiform elements. In this last case, it can serve as a base for the production of a composite material, a matrix being added to fill in the free spaces inside said structure. The matrix is preferably a refractory material, such as for example silicon carbide introduced by the chemical vapor deposition method; the resulting material is then a SiC—SiC composite.

To carry out the method according to the invention, and as indicated hereinabove, the impregnation mixture which is used contains a fugitive resin filled with silicon powder and diluted in a solvent.

By fugitive resin is meant here a resin with a nilrate of coke, i.e. which leaves no residue capable of reacting with the silicon during the heat treatment or of remaining on the carbon structure.

For example the fugitive resin selected is a polyvinyl alcohol or a polymethacrylate. These resins are products well known per se and the solvents used are selected from normally known solvents for these resins, for examples water or an alcohol for polyvinyl alcohols.

The composition of the impregnation mixture is selected so as to ensure a good "wetting" of the carbon structure by the silicon. Moreover, the viscosity of the mixture should be sufficient to keep the silicon powder suspended long enough to carry out the method, several hours for example. Finally, the quantity of silicon powder used is selected to be sufficient, although limited, to obtain a final texture which is essentially constituted of silicon carbide, but without any free silicon, whereas the proportion of residual carbon can be predetermined by selecting the proportion of silicon powder in the impregnation mixture.

By way of example, the proportions by weight in the impregnation mixture are 10 to 30% for the fugitive resin and 20 to 40% for the silicon powder, the remainder being constituted by the solvent.

The silicon powder is selected to have a granulometry such that it constitutes a stable suspension: the size of the silicon particles being preferably less than $40\mu$.

The impregnation of the carbon structure is obtained by passing said structure into the bath constituted by the impregnation mixture at room temperature. In the case of a filiform or strip-shaped structure, this is done by causing the structure to stream continuously in the bath.

After the impregnation stage, the solvent is removed by drying under heat, for example in an oven. A rigid and easy-to-handle impregnated structure is then obtained.

The impregnated structure can be shaped, depending on the article to be produced, before the final heat treatment which will transform it into a silicon carbide structure. For example, starting with a carbon material, this is impregnated, dried, and then cut into layers of the desired shapes and dimensions, with a view to producing the desired article by stacking up the said layers and heat treating the stack. In the same way, starting with a filiform carbon element, this is impregnated and dried to obtain rods which are assembled to form the desired multidirectional texture before the final heat treatment. It is of course equally possible to start from a carbon structure having already the structure of the silicon carbide to be produced.

The final heat treatment is conducted in neutral atmosphere, at a temperature higher than the melting point of silicon and for long enough to allow the silicon to melt and to blend completely with the carbon.

By way of indication, the temperature can be selected to be between 1450° C. and 1800° C., the atmosphere to be neutral argon or nitrogen at atmospheric pressure, and the treatment duration can vary between 2 and 60 minutes. A temperature and duration exceeding the maximum limits indicated bring no noticeable improvements in the result compared with the increased difficulties, time and costs involved.

During the heat treatment, one can observe successively the complete elimination of the fugitive resin, the melting of the silicon powder and the reaction of the liquid silicon with the carbon to give silicon carbide.

The material according to the invention is characterized by a proportion by weight of silicon carbide which is at least equal to 60%, hence an excellent resistance to oxidation. Moreover, when in the form of stacked layers of material or of multi-directional texture formed by the criss-crossing of rods, the material according to the invention has proved capable to withstand any of the usual densifying methods to obtain a refractory composite material of high mechanical resistance.

Figure 1B:
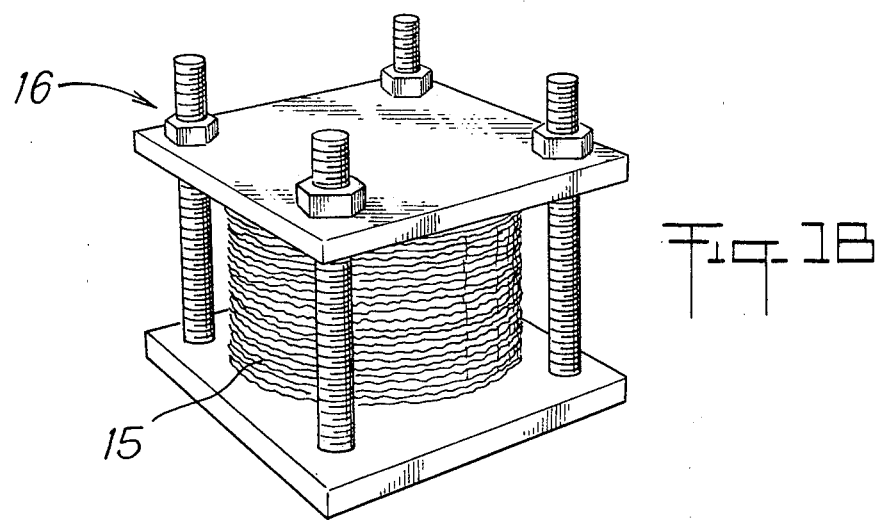
Figure 2:
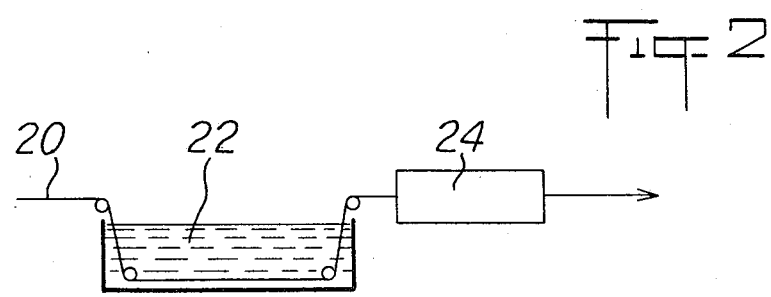

Special ways of carrying out the method according to the invention are described in details in the following examples, reference being made to the accompanying drawings in which:

FIG. 1A is a very diagrammatical view illustrating the method according to the invention used on a carbon material; and FIG. 1B illustrates a stack of layers of material immobilized in a holding instrument in which it is held throughout the heat treatment; and FIG. 2 is a view illustrating part of the method according to the invention used on a carbon filament.

The method according to the invention is used on a structure constituted by a filiform element, such as for example a carbon filament or by a carbon or graphite material or by a multidirectional texture formed by a criss-crossing of carbon fibers or rods of cross-ply orientation.

The carbon fibers or materials are, in known manner, issued from precursors such as rayon, polyacrilonitriles, cotton, tar, etc. The materials can have various types of armatures: unidirectional, satin, linen, etc., have a very diversified structure, number of loops per cm, thickness, weight per m2, etc., and be composed of continuous or discontinuous filaments. The fibers can comprise any number of continuous or discontinuous filaments, this number being selected in relation to the diameter of the silicon carbide fiber to be produced.

The following are examples of possible ways to conduct the method according to the invention.

EXAMPLE 1

A canvas-weaved graphite material from a rayon precursor is impregnated by being put through a bath containing, by weight, 20% fugitive resin, 30% silicon powder and 50% solvent.

The fugitive resin used is a polyvinyl alcohol and the solvent water. The silicon powder is formed of particles of average dimensions, about $40\mu$.

It is noted that the bath has enough viscosity to hold the silicon powder in suspension for several hours. Moreover, said bath ensures a good absorption of the silicon powder-filled resin by the material.

As illustrated in FIG. 1A, the material is in the form of a layer 10 which is moved continuously, guided by rollers 11, inside a tub 12 containing the impregnation bath at room temperature. On leaving the tub 12, the strip of material 10 goes through a wringer 13 to remove any excess of impregnation mixture, then it is put through a tunnel oven 14 to remove the solvent by evaporation under heat. The material leaving the oven 14 is dry, rigid and easy-to-handle, and it is composed of 30% by weight of graphite material, 45% by weight of silicon powder and 25% by weight of fugitive resin.

To obtain a silicon carbide material, the impregnated material receives a heat treatment in an oven with argon atmosphere, at a pressure equal to 760 mm mercury, at a temperature of 1600° C. and for a period of 15 mins.

At the end of this heat treatment, a 25% reduction in weight is observed, which corresponds to the removal of the fugitive resin and to the transformation of the graphite material into silicon carbide material.

The material obtained is rigid and very easy to handle. Analysis shows that it is composed of crystallized silicon carbide in the proportion of 82% by weight and of free carbon in the proportion of 18% by weight.

There is no free silicon left. It will be noted that the proportion of residual carbon can be altered by changing the composition of the impregnation bath.

An examination under the electron microscope has shown that the silicon carbide material retains the texture of the original graphite material. The same initial form of the graphite material fiber is also found.

The material obtained was exposed in the open for 17 hours at a temperature of 1000° C. A weight reduction equal to 15% of the initial weight of the silicon carbide material was observed, without any disaggregation of the material. By way of comparison, the original graphite material disappears entirely after being exposed in the open at 1000° C. for 30 mins. only.

EXAMPLE 2

The procedure is the same as in Example 1 up to the stage where the material coated with silicon is obtained after the removal of the solvent and before the final heat treatment.

Layers are cut from the material and stacked according to the shape of the article to be produced.

The stack of layers 15 is immobilized in an instrument 16 (FIG. 1B) inside which it is held throughout the heat treatment, which is the same as that described in Example 1 to transform the material into a silicon carbide material.

The texture is the same as the material obtained in Example 1.

Said texture can be densified by introducing a matrix in the empty spaces left between the material fibers of the different layers.

To this effect, the texture, clamped in its instrument, is for example introduced in a pyrocarbon infiltration oven, so as to produce, in a manner known per se, a vapor deposit of pyrolytic carbon inside the texture. A composite material C-SiC is then obtained. The SiC material retains virtually all its integrity inside the said material even after mechanical stress. Indeed, an oxidation at 1000° C. of this composite material after a mechanical test has allowed the complete removal of the pyrocarbon and the quasi-total recovery of the silicon carbide material.

The same densification technique by chemical vapor deposition has permitted to vapor deposit a silicon carbide matrix in a texture formed by the stacking up of layers of silicon carbide material, in order to obtain a composite material SiC—SiC.

EXAMPLE 3

A carbon filament 20 (FIG. 2) with polyacrylonitrile precursor, guided by cylinders 21, is impregnated by passing continuously inside a tub 22 containing an impregnation bath identical to that indicated in Example 1.

After the filament leaves the bath, it is calibrated and the solvent is removed under heat when passing through an enclosure 24 thus permitting to obtain a stick 15, which is calibrated, rigid, non-brittle and easy-to-handle.

Several rods of diameters varying between 0.4 mm and 3 mm have thus been obtained.

These rods receive a heat treatment in the conditions indicated in the Example 1 and a rigid and easy-to-handle silicon carbide filament is obtained.

With a rod constituted, by weight, of 55% carbon filament, of 25% silicon powder and of 20% fugitive resin, it is possible to obtain a silicon carbide filament containing 97% by weight of crystallized silicon carbide, the remaining part being free carbon excluding free silicon. Said filament when exposed in the open for 17 hours at 1000° C. does not disaggregate, the loss in weight recorded being only 1%.

EXAMPLE 4

A carbon filament of 1 mm diameter with polyacrylonitrile precursor is impregnated by being passed through a bath containing, by weight, 60% solvent, 30% silicon powder and 10% fugitive resin.

After elimination of the solvent, rods of 1 mm diameter are obtained, with the following proportions by weight of constituent, 55% of carbon filament, 35% of silicon powder and 10% fugitive resin.

The rods obtained are rigid and very easy to handle without breaking.

Said rods are used to build a block of multidirectional texture of the 4-D type such as described in French Pat. No. 2 276 916. In the block obtained, the rods form four bundles of criss-crossed rods parallel together in each bundle, the four directions of the bundles being oriented according to the large diagonals of a cube. The dimensions of the resulting block are 50 mm×50 mm×100 mm.

The block built with the rods receives a heat treatment in the condition indicated in Example 1 to obtain successively the removal of the fugitive resin, the fusion of the silicon powder and the reaction of the liquid silicon with the carbon. During this treatment, the texture of the 4-D block is not altered in any way and there is no swelling or movement of the rods observed, nor any bursting of the carbon fibers.

The analysis of the resulting block shows that it is constituted by 60% by weight of silicon carbide and by 40% by weight of residual free carbon. It is to be noted that the relatively high proportion of residual carbon is due to the special composition of the impregnation bath, the proportion of resin being lower than in the previous examples. As already indicated, the quantity of residual free carbon in the final product can indeed be adjusted by changing the composition of the impregnation bath.

The 4-D texture obtained is exposed in the open for 17 hours at 1000° C. Although a 35% loss of weight is recorded, due to the residual carbon, the texture does not disaggregate. On the contrary, a 4-D block made entirely of carbon disappears entirely when subjected to the same conditions.

The 4-D texture containing silicon carbide can be used as reinforcement texture in a composite material obtained by depositing a matrix in the free spaces between the texture elements. It is in particular possible to use the known techniques of densification by chemical vapor deposition to deposit the silicon carbide and thus obtain a composite material SiC-SiC. It would also be possible to use the known techniques of impregnation of the texture by liquid means to fit in a matrix in alumina, zirconia, or silicon carbide for example.

The invention therefore permits to produce composite materials (fabrics or densified tri-dimensional textures) which combine the refractory properties of the constituents with the good mechanical resistance offered by the texture of the material.

The invention is not limited to the description given hereinabove, but on the contrary, covers any modification or additions that can be brought thereto without departing from the scope or the spirit thereof.

What is claimed is:

1. A method for producing a silicon carbide structure, comprising the steps consisting in:
   impregnating a carbon structure by immersion into a bath containing 10 to 30% by weight of fugitive resin, 20 to 40% by weight of silicon powder in suspension, the remainder being essentially constituted by a solvent of said resin,
   drying the impregnated structure so as to obtain an easy to handle structure coated with resin and silicon powder bonded in the resin, and
   heat-treating the coated structure in neutral atmosphere at a temperature of between 1450° C. and 1800° C., for a time period of between 2 to 60 minutes and substantially at atmospheric pressure, in order to let the silicon react with the carbon and to obtain the desired carbide structure.

2. Method as claimed in claim 1, wherein the structure is impregnated by continuous displacement in the bath.

3. Method as claimed in claim 1, wherein the carbon structure coated with silicon and resin is used, after the removal of the solvent, to produce an assembly which depends on the shape of the silicon carbide structure to be obtained, said assembly being then subjected to the said heat treatment.

4. Method as claimed in claim 3, using carbon material structure, wherein layers of the impregnated material are stacked, the stack being subjected to the said heat treatment.

5. Method as claimed in claim 3, using a carbon structure constituted by a filament, wherein after impregnation of the filament and removal of the solvent, rods are formed from the said filament coated with silicon powder and resin, the rods are assembled to obtain a multidirectional texture which is then subjected to the said heat treatment.

* * * * *